United States Patent
Arnault et al.

(10) Patent No.: US 12,151,528 B2
(45) Date of Patent: *Nov. 26, 2024

(54) SUSPENSION ABUTMENT DEVICE WITH SEAL

(71) Applicant: Aktiebolaget SKF, Gothenburg (SE)

(72) Inventors: Benoit Arnault, Saint-Cyr-sur-Loire (FR); Baptiste Vidil, Vannes (FR); Thomas Lepine, Tours (FR); Christophe Houdayer, Semblancay (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,784

(22) Filed: Oct. 7, 2023

(65) Prior Publication Data
US 2024/0123786 A1 Apr. 18, 2024

Related U.S. Application Data

(62) Division of application No. 17/868,905, filed on Jul. 20, 2022, now Pat. No. 11,958,325.

(30) Foreign Application Priority Data

Jul. 23, 2021 (FR) ........................ 2108001

(51) Int. Cl.
*B60G 15/06* (2006.01)
*F16C 19/10* (2006.01)
*F16C 33/76* (2006.01)
*F16C 35/04* (2006.01)

(52) U.S. Cl.
CPC ............ *B60G 15/067* (2013.01); *F16C 19/10* (2013.01); *F16C 33/761* (2013.01); *F16C 33/768* (2013.01); *F16C 35/042* (2013.01); *B60G 2202/12* (2013.01); *B60G 2204/418* (2013.01); *F16C 2326/05* (2013.01)

(58) Field of Classification Search
CPC .... B60G 15/067; B60G 15/068; F16C 35/042
See application file for complete search history.

(56) References Cited

U.S. PATENT DOCUMENTS

| | | |
|---|---|---|
| 2011/0101584 A1 | 5/2011 | Viault et al. |
| 2013/0195393 A1 | 8/2013 | Corbett et al. |
| 2017/0158012 A1 | 6/2017 | Hubert et al. |
| 2020/0370606 A1 | 11/2020 | Arnault et al. |
| 2023/0026198 A1 | 1/2023 | Lepine et al. |
| 2023/0028328 A1 | 1/2023 | Blanchard et al. |

FOREIGN PATENT DOCUMENTS

| | | |
|---|---|---|
| DE | 102017210728 A1 | 12/2018 |
| DE | 102020201404 A1 | 8/2021 |
| DE | 102020201405 A1 | 8/2021 |

(Continued)

*Primary Examiner* — Nicole T Verley
(74) *Attorney, Agent, or Firm* — GARCIA-ZAMOR INTELLECTUAL PROPERTY LAW, LLC; Ruy Garcia-Zamor

(57) ABSTRACT

A device includes a lower support cap, an upper bearing cap, at least one bearing disposed between the caps and at least one annular seal. The seal provides a claw secured by mechanical connection to the upper support cap, a sealing lip extending obliquely from the claw in the direction of the upper bearing cap.

20 Claims, 2 Drawing Sheets

(56) References Cited

FOREIGN PATENT DOCUMENTS

| | | | |
|---|---|---|---|
| DE | 102020202617 A1 | 9/2021 | |
| DE | 102020202618 A1 | 9/2021 | |
| EP | 0296960 A1 | 12/1988 | |
| EP | 2357371 A1 | 8/2011 | |
| FR | 2865008 A1 | 7/2005 | |
| FR | 2920700 A1 | 3/2009 | |
| FR | 2966086 A1 | 4/2012 | |
| FR | 2990252 A1 | 11/2013 | |
| FR | 3117938 A1 | 6/2022 | |
| FR | 3117939 A1 | 6/2022 | |
| FR | 3117940 A1 | 6/2022 | |
| FR | 3120568 A1 | 9/2022 | |
| FR | 3125498 A1 | 1/2023 | |
| JP | 2013234755 A | 11/2013 | |
| WO | 2008081122 A2 | 7/2008 | |
| WO | 2009106469 A1 | 9/2009 | |
| WO | 2010012766 A1 | 2/2010 | |
| WO | 2011012484 A1 | 2/2011 | |
| WO | 2011076626 A1 | 6/2011 | |
| WO | 2011120563 A1 | 10/2011 | |
| WO | 2012028177 A1 | 3/2012 | |
| WO | 2015014760 A1 | 2/2015 | |

[Fig 1]
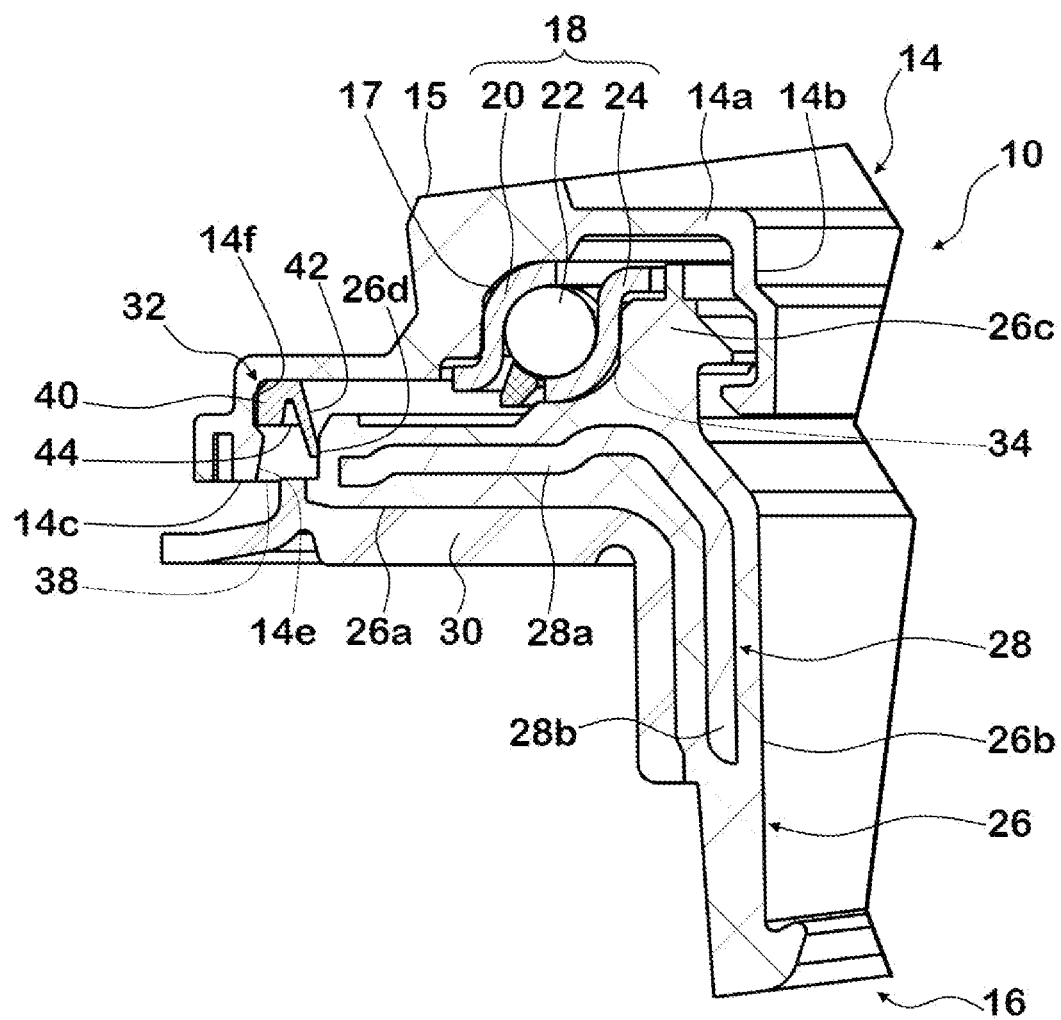

[Fig 2]
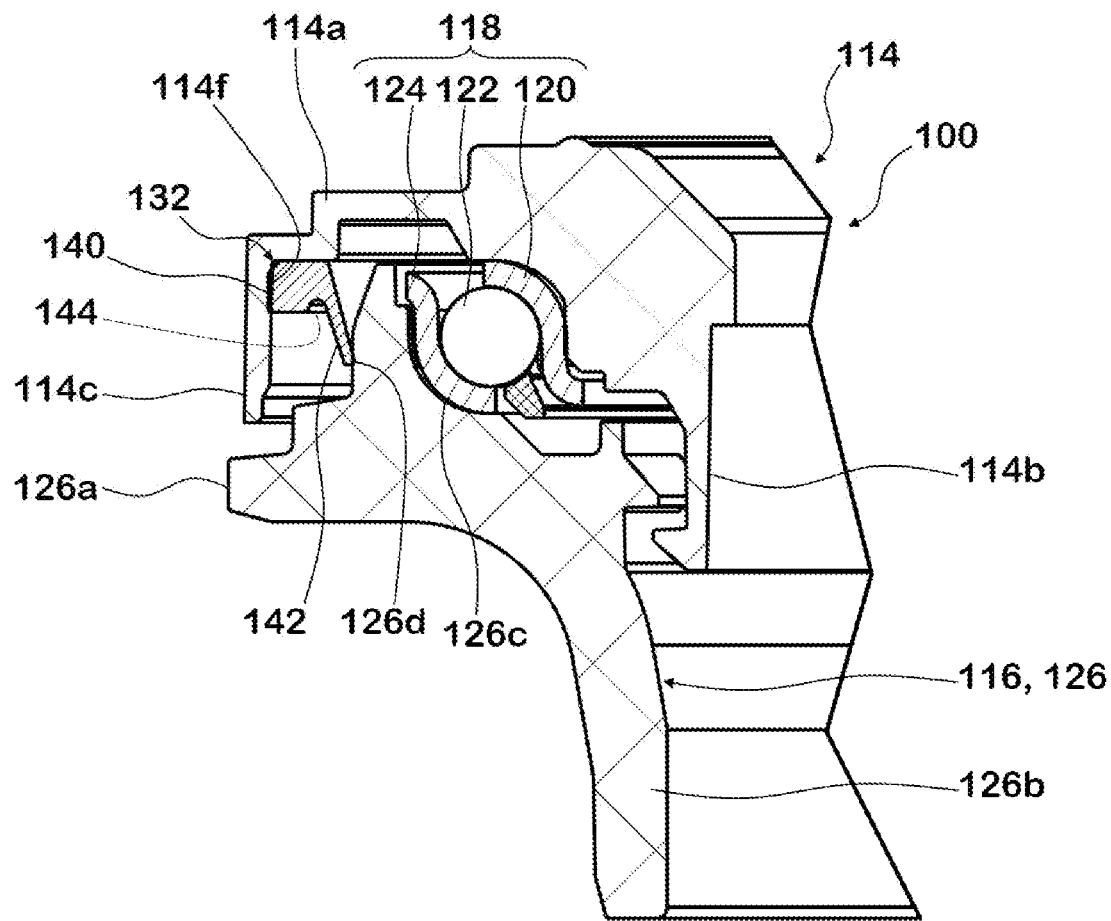

SUSPENSION ABUTMENT DEVICE WITH SEAL

CROSS-REFERENCE TO RELATED APPLICATIONS

This application claims priority to French Patent Application no. 2108001, filed Jul. 23, 2021, the contents of which is fully incorporated herein by reference.

TECHNICAL FIELD OF THE INVENTION

The present invention concerns the field of suspension abutment devices used in particular in the suspension struts of the steerable wheels of automobile vehicles.

PRIOR ART

A suspension abutment device generally comprises a bearing forming an axial abutment and upper and lower caps forming a housing for the races of the bearing and enabling the interface between the races and the nearby elements to be assured.

The suspension abutment device is disposed in the upper part of the suspension strut between a suspension spring and the body of the vehicle. The suspension spring is mounted around a shock absorber piston rod the end of which is connected to the body of the vehicle. The suspension spring, of the coil spring type, comes to bear axially and directly or indirectly on the lower cap of the suspension abutment device.

The suspension abutment device enables transmission of axial and radial forces between the suspension spring and the body of the vehicle whilst allowing relative rotation movement between the lower cap and the upper cap stemming from turning of the steerable wheels of the vehicle and/or compression of the suspension spring.

The upper cap of the suspension abutment device is generally provided with a plurality of hooks disposed on an external or internal skirt and adapted to interfere diametrally with a plurality of hooks of the lower cap. The hooks of each cap are spaced from one another in the circumferential direction.

The hooks form retaining means enabling axial retention of the upper and lower caps the one relative to the other. These hooks also form narrow passages in order to limit the radial intrusion of polluting particles between the external or internal skirt of the upper cap and the lower cap.

However, a suspension abutment device is generally exposed to various types of pollution. With this kind of device pollutant particles and water can easily infiltrate between the external or internal skirt of the upper cap and the lower cap, then to be directed toward the bearing and to be introduced into the interior of the latter. It is common to provide at least one rigid or flexible material seal in such a manner as to form a barrier for preventing the entry of pollution into the space between the caps.

The present invention aims to provide a seal of improved efficacy and assembly.

SUMMARY OF THE INVENTION

The invention concerns a suspension abutment device comprising a lower support cap provided with an annular radial support portion, an upper bearing cap provided with an annular radial bearing portion and an annular axial external skirt, an annular passage being defined between the axial external skirt and the radial support portion, at least one bearing disposed between an upper surface of the radial support portion and a lower surface of the radial bearing portion, and at least one annular seal disposed radially at least in part between the exterior skirt of the upper bearing cap and the bearing.

In accordance with the invention, the seal comprises an annular claw secured by mechanical connection to an interior axial surface of the axial external skirt of the upper bearing cap and at least one sealing lip extending obliquely inwards and downwards from the claw, in the direction of the radial support portion of the lower bearing cap, in such a manner that a free end of the lip comes into the immediate proximity of a surface of the radial support portion, the seal being formed in one piece.

The sealing lip enables l imitation of the intrusion of dust, water and other types of pollutant particles into the interior of the bearing. An external annular cavity is thus formed inside the device by the external skirt, the radial support portion and the sealing lip, the cavity being open to the outside via the passage formed between the axial external skirt and the radial support portion. The free end part of the sealing lip forms a dynamic seal with the lower support cap, and this dynamic seal may be achieved by sliding contact with a surface portion of the cap or by a labyrinth. By "dynamic seal" is meant a seal between two parts liable to relative movement. The sealing lip of the seal enables the flow of water to be stopped and diverted away from the bearing. The sealing lip thus forms an upper wall for the external annular cavity so as to face into a possible jet of water entering from the passage formed between the axial external skirt and the radial support portion.

The sealing lip is inclined relative to the axial orientation of the external skirt of the upper bearing cap in which the claw of the seal is mounted and relative to the radial orientation of the support portion with which the lip forms a seal. To be more precise, this inclination is directed toward the interior of the suspension abutment device and downwards. In the event of a water jet entering into the external annular cavity from the passage, that jet is deflected by the specific inclination of the lip in such a manner as to form a reflow inside the cavity. This is accentuated by the annular claw, which offers an additional wall against which the jet may come to impact. The particular orientation of the inclination of the lip induces a reflow deflecting the jet in the opposite direction to the direction in which it arrives: the jet is therefore deflected and sent back toward the passage in another direction, thus enabling the evacuation of the jet of water.

The annular claw enables a mechanical connection of the seal with the upper bearing cap to be assured in order to limit all relative movement in translation or in rotation. The seal is retained in position when the suspension abutment device is functioning to assure the function of sealing the annular space defined between the upper bearing cap and the lower support cap in which the bearing is housed.

In accordance with advantageous but non-obligatory features of the invention, this kind of suspension abutment device may incorporate one or more of the following features in any technically permissible combination:

The annular claw is of parallelepipedal shape.

The mechanical connection between the annular claw of the seal and the annular axial external skirt of the upper bearing cap consists in a diametral interference fit between the outside diameter of the claw and the inside diameter of an axial interior surface of the external skirt.

The interior axial surface of the external skirt is delimited axially at the bottom by a lower rim projecting radially toward the interior of the device, the lower rim forming lower axial retention means for the annular claw.

The interior axial surface of the external skirt is delimited axially at the top by an upper rim projecting radially toward the interior of the device, the upper rim forming upper axial retention means for the annular claw.

The upper rim is formed by the annular radial bearing portion of the upper bearing cap, the claw being housed in an annular internal junction corner formed between the radial bearing portion and the axial external skirt.

The bearing is a rolling bearing comprising a first race supported by an upper face of the annular radial support portion, a second race supported by a lower face of the upper bearing cap, and a plurality of rolling elements housed between the races.

The free edge of the sealing lip forms a labyrinth seal with a surface of the radial support portion.

The free edge of the sealing lip is in sliding contact with a surface of the radial support portion.

The contact surface of the radial support portion with the free edge of the sealing lip is an exterior axial surface.

The upper face of the annular radial support portion comprises an annular radial projection provided with an annular concave surface of matching shape forming a support for the first race of the rolling bearing and an exterior axial surface against which the free edge of the sealing lip comes into sliding contact.

The radial support portion comprises an exterior peripheral rim defining an exterior axial surface against which the free edge of the sealing lip comes into sliding contact.

An annular hollow is defined between the at least one sealing lip and the annular claw.

The body of the lower support cap is made of plastic material of polyamide type (for example PA6 to PA6.6), optionally reinforced by glass fibres (for example GF 30 to 60).

The seal is made of a rigid material, for example of polyoxymethylene (POM).

The seal is made of a polymer material, for example of a thermoplastic elastomer (TPE).

BRIEF DESCRIPTION OF THE FIGURES

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention will be better understood after studying the detailed description of embodiments given by way of nonlimiting example and illustrated by the appended drawings, in which:

FIG. 1 is a view in section of a suspension abutment device in accordance with first embodiment of the invention, and FIG. 2 is a view in section of a suspension abutment device in accordance with second embodiment of the invention.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. A suspension abutment device 10 in accordance with a first embodiment is represented in FIG. 1. The device 10 is adapted to be installed between an upper bearing cup or seat coming into contact against an element of the fixed frame of an automobile vehicle and a suspension spring of coil type. In FIG. 1, the device 10 is represented in a supposedly vertical position.

The device 10 comprises an upper bearing cap 14, a lower support cap 16 and a rolling bearing 18 disposed axially between the caps. In the example illustrated, the caps 14, 16 are mounted in direct contact with the bearing 18 with no interposition of an intermediate element. Alternatively, the caps 14, 16 may be mounted in indirect contact with the bearing 18 with interposition of an intermediate element.

As will be described in more detail hereinafter, the device 10 further comprises an external seal 32 for preventing the intrusion of pollutants toward the bearing 18. The seal 32 shuts off the axial space defined between the lower support cap 16 and the upper bearing cap 14 given the interposition of the bearing 18 between those caps, the space being open via an annular exterior passage 38 between the caps 14 and 16.

The upper bearing cap 14 comprises a radial portion 14a, an annular axial internal skirt 14b and an annular axial external skirt 14c radially surrounding the internal skirt. The radial portion 14a has an upper surface 15 intended to come to face the upper bearing seat and an opposite lower surface 17 in contact with the bearing 18. The upper and lower surfaces 15, 17 define the thickness of the radial portion 14a. In the example shown, the radial portion 14a has a stepped shape.

The external skirt 14c of the bearing cap surrounds the lower support cap 16 radially in part. The external skirt 14c extends axially. The external skirt 14c extends axially from the radial portion 14a. In the example illustrated, the external skirt 14c extends a large diameter edge of the radial portion 14a in such a manner as to form an annular internal junction corner.

The internal skirt 14b of the bearing cap extends inside the bore of the lower support cap 16. The internal and external skirts 14b, 14c extend axially downwards from the radial portion 14a. The internal skirt 14b extends a small diameter edge of the radial portion 14a.

The upper bearing cap 14 may be made in one piece, for example of a plastic material, such as a PA 6.6 polyamide for example, which may optionally be reinforced by glass fibres.

The bearing 18 is entirely situated radially between the skirts 14b, 14c of the upper bearing cap 14. The bearing 18 comprises an upper race 20 in contact with the upper bearing cap 14, a lower race 24 in contact with the lower support cap 16 and a row of rolling elements 22, here balls, disposed between the raceways formed on the races. In the example illustrated, the bearing 18 is of the oblique contact type. The upper race 20 is in contact with the lower surface 17 of the upper bearing cap. The lower race 24 is in contact with an upper surface of the lower support cap 16. The upper race 20 is positioned toward the exterior of the device 10 and the lower race 24 is positioned towards the interior of the device 10.

The lower support cap 16 comprises a body 26, a stiffener insert 28 and a shock absorber 30.

The body 26 of the lower support cap 16 comprises an annular radial portion 26a of plate shape and an annular axial skirt 26b that extends a small diameter edge of the radial portion 26a. The skirt 26b extends axially away from the upper bearing cap 14 and the bearing 18. The skirt 26b enables the centring of a suspension spring (not illustrated). The radial portion 26a has a lower annular radial surface and an upper surface 34 in contact with the lower race 24 of the bearing and of matching shape. The upper surface 34 advantageously comprises an annular axial projection 26c provided with an annular concave surface of matching shape and forming a support for the lower race 24 of the rolling bearing 18.

The body 26 of the lower support cap 16 is in one piece and made of a plastic material, such as a PA 6 to 6.6 polyamide for example, which may optionally be reinforced by GF 30 to 60 glass fibres.

In the example illustrated, the support cap 16 comprises a shock absorber 30 provided on the lower surface of the body 26. The shock absorber is made in one piece from an elastic material and comprises a first portion on the lower radial surface of the radial portion 26a and a second portion on the exterior cylindrical surface of the axial skirt 26b. The shock absorber 30 has a lower annular radial surface 36 supporting a suspension spring. The shock absorber 30 enables damping of shocks and vibrations transmitted by the suspension spring to the lower support cap 16. Alternatively, the lower support cap 16 does not comprise a shock absorber, the lower annular radial surface of the radial portion 26a of the body 26 then forming a direct support for the suspension spring.

The lower support cap 16 further comprises a stiffener insert 28 with an annular radial insert portion 28a extending in the annular radial support portion 26a of the body 26 and an annular axial insert tubular portion 28b extending in the annular axial support skirt 26b, the axial insert tubular portion extending a small diameter edge of the radial insert portion.

The stiffener insert 28 is made of metal, for example of steel. The plastic material of the body 26 of the lower cap 16 is moulded over the insert 28.

As indicated above, an external seal 32 is provided between the lower support cap 16 and the upper bearing cap 14 in order to seal the bearing housing in the radial annular space defined between the caps. The seal 32 is fixed relative to the support cap 16.

The seal 32 is annular and radially surrounds the bearing 18. The bearing 18 is situated radially on the interior side of the seal 32. The seal 32 is situated upstream of the bearing 18 on the exterior side of the device 10. The seal 32 is situated radially in part between the external skirt 14c of the bearing cap and the bearing 18.

The seal 32 comprises an annular claw 40 secured by a mechanical connection to the upper bearing cap and a sealing lip 42 extending from the claw 40.

The annular claw 40 is advantageously of parallelepipedal shape and housed in the junction corner between the external skirt 14c and the radial portion 14a of the upper bearing cap 14. A lower surface of the bearing radial portion 14a forms an upper rim to assure upper axial retention of the claw 40 in the upper bearing cap 14. The external skirt 14c further comprises a lower rim 14e projecting radially towards the interior of the device 10, the lower rim 14e forming lower axial retention means for the annular claw 40.

The mechanical connection between the annular claw 40 of the seal 32 and the annular axial external skirt 14c of the upper bearing cap 14 consists in a diametral interference fit between the outside diameter of the claw 40 and the inside diameter of a lower axial surface 14f of the external skirt 14c, the lower axial surface 14f being delimited axially at the top by the radial portion 26a and at the bottom by the lower rim 14e.

The sealing lip 42 of the seal 32 projects from an interior face of the parallelepipedal annular claw 40. The lip 42 extends in the direction of the radial support portion 26a of the body 26 of the lower bearing cap 16 in such a manner that a free edge of the lip 42 comes into sliding contact against an exterior axial surface 26d of the exterior peripheral rim of the radial support portion 16a. The sealing lip 42 extends from the claw 40 obliquely inwards and downwards.

Thus an external annular cavity is formed inside the suspension abutment device 10 by the external skirt 14c of the upper bearing cap 14, the radial support portion 26a of the body 26 of the lower support cap 16 and the seal 32. The cavity is open to the outside via the passage 38 formed between the axial external skirt 14c and the radial support portion 26a. Thus the sealing lip 42 forms an upper wall for the external annular cavity facing any jet of water entering from the passage 38. The free edge part of the sealing lip 42 forms a dynamic seal with the lower support cap 16.

The sealing lip 42 is moreover inclined relative to the axial orientation of the external skirt 14c of the upper bearing cap 14 in which the claw 40 of the sealing lip 32 is mounted and relative to the radial orientation of the support portion 26a with which the lip 42 forms a seal. To be more precise, this inclination is directed towards the interior of the suspension abutment device 10 and downwards. In the event of a jet of water entering into the external annular cavity from the passage 38, that jet is deflected by the specific inclination of the lip 42 so as to form a reflow inside the cavity. This is accentuated by the annular claw 40, which offers a lower face against which the jet may come to impact. The particular orientation of the inclination of the lip 42 induces a reflow deflecting the jet in the direction opposite to the direction in which it arrives: the jet is therefore deflected and sent back toward the passage in another direction, thus enabling evacuation of the jet of water.

In a particularly advantageous manner, an annular hollow 44 is defined between the lip 42 and an interior face of the annular claw 40. This hollow 44 enables flexibility to be imparted to the lip 42. The lip 42 is therefore able to deform elastically and to assure a sliding contact in the event of relative osculation between the upper cap 14 and the lower cap 16.

The sealing lip 42 of the seal forms a dynamic seal with the bearing cap 14 over 360°. The annular claw 40 of the seal 32 is in static sealing contact with the support cap 16 over 360°.

The seal 32 is formed in one piece, for example by moulding. The seal 32 may for example be made of a rigid material, for example of polyoxymethylene (POM). Alternatively, the seal 32 may equally be made of a less rigid material, for example of a thermoplastic elastomer, or of an elastomer such as nitrile.

A second embodiment of the invention is illustrated in FIG. 2. A suspension abutment device 100 features a design of improved radial compactness.

The device 100 comprises an upper bearing cap 114, a lower support cap 116 and a rolling bearing 118 disposed axially between the caps.

The upper bearing cap 114 comprises a radial portion 114a, an annular axial internal skirt 114b and an annular axial external skirt 114c radially surrounding the internal skirt. The bearing radial portion 114a of the device 100 has a reduced radial dimension compared to the radial portion 14a of the device 10 of the previous embodiment.

The bearing 118 is entirely situated radially between the skirts 114b, 114c of the upper bearing cap 114. The bearing 118 comprises an upper race 120 in contact with the upper bearing cap 114, a lower race 124 in contact with the lower support cap 116 and a row of rolling elements 122, here balls, disposed between the raceways formed on the races. Compared to the device 10 of the preceding embodiment, the upper race 120 is positioned towards the interior of the device 100 and the lower race 124 is positioned toward the exterior of the device 100.

The lower support cap 116 comprises only one body 126. The lower support cap 116 comprises an annular radial portion 126a of plate shape and an annular axial skirt 126b that extends a small diameter edge of the radial portion 126a. The support radial portion 126a of the device 100 has a reduced radial dimension compared to the radial portion 16a of the device 10 of the preceding embodiment.

The lower support cap 116 further comprises an annular axial projection 126c provided with an annular concave surface of matching shape and forming a support for the lower race 124 of the rolling bearing 118.

An external seal 132 is provided between the lower support cap 116 and the upper support cap 114 in order to seal the bearing 118 housed in the radial annular space defined between the caps. The seal 132 is fixed relative to the support cap 116.

The seal 132 is similar to the seal 32 of the device 10 of the preceding embodiment. The seal 132 comprises an annular claw 140 and a sealing lip 142 of similar design to the annular claw 40 and the sealing lip 42.

The annular claw 140 is advantageously of parallelepipedal shape and housed in the junction corner between the external skirt 114c and the radial portion 114a of the upper bearing cap 114. A lower surface of the bearing radial portion 114a forms an upper rim for assuring upper axial retention of the claw 140 in the upper bearing cap 114.

The mechanical connection between the annular claw 140 of the seal 132 and the annular axial skirt 114c of the upper bearing cap 114 consists in a diametral interference fit between the outside diameter of the claw 140 and the inside diameter of an interior axial surface 114f of the external skirt 114c, the interior axial surface 114f being delimited axially at the top by the radial portion 126a and at the bottom by a free edge.

The sealing lip 142 of the seal 132 projects from an interior face of the parallelepipedal annular claw 140. The lip 142 extends in the direction of the radial support portion 126a of the body 126 of the lower bearing cap 116 in such a manner that a free edge of the lip 142 comes into sliding contact against an exterior axial surface 126d of the annular projection 126c of the radial support portion 116a. The sealing lip 142 extends from the claw 140 obliquely inwards and downwards.

The seal 132 further comprises an annular hollow 144 at the junction between the claw 140 and the lip 142.

In the embodiments illustrated, the device comprises an oblique contact rolling bearing provided with a row of balls. The device may comprise other types of rolling bearings, for example a bearing with four points of contact and/or with at least two rows of balls. The rolling bearing may comprise other types of rolling elements, for example rollers. In another variant, the device may comprise a sliding bearing with no rolling elements and provided with one or more races.

The invention claimed is:

1. A suspension abutment device comprising:
   a lower support cap provided with an annular radial support portion,
   an upper bearing cap provided with an annular radial bearing portion, and
   an annular axial external skirt,
   an annular passage being defined between the axial external skirt and the annular radial support portion,
   at least one bearing disposed between an upper surface of the annular radial support portion and a lower surface of the annular radial bearing portion, and
   at least one annular seal disposed radially at least in part between the exterior skirt of the upper bearing cap and the at least one bearing, wherein
   the at least one annular seal comprises an annular claw secured by mechanical connection to an interior axial surface of the axial external skirt of the upper bearing cap and at least one sealing lip extending obliquely inwards and downwards from the claw, in the direction of the annular radial support portion of a lower bearing cap, in such a manner that a free end of the at least one sealing lip comes into the immediate proximity of a surface of the annular radial support portion, the at least one annular seal being formed in one piece.

2. The device of claim 1, in which the annular claw is of parallelepipedal shape.

3. The device of claim 2, wherein the mechanical connection between the annular claw of the at least one annular seal and the annular axial external skirt of the upper bearing cap consists in a diametral interference fit between the outside diameter of the claw and the inside diameter of an axial interior surface external skirt.

4. The device of claim 1, wherein the mechanical connection between the annular claw of the at least one annular seal and the annular axial external skirt of the upper bearing cap consists in a diametral interference fit between the outside diameter of the claw and the inside diameter of an axial interior surface external skirt.

5. The device of claim 4, wherein the interior axial surface of the external skirt is delimited axially at the top by the radial portion and at the bottom by a free edge.

6. The device of claim 1, wherein the free edge of the at least one sealing lip is in sliding contact with a surface of the annular radial support portion.

7. The device of claim 6, wherein the contact surface of the annular radial support portion with the free edge of the at least one sealing lip is an exterior axial surface.

8. The device of claim 7, wherein the annular radial support portion comprises an exterior peripheral rim defining an exterior axial surface against which the free edge of the at least one sealing lip comes into sliding contact.

9. The device of claim 7, wherein the at least one bearing is a rolling bearing cap comprising an upper race in contact with the upper bearing cap and a lower race in contact with the lower support cap and a row of rolling elements disposed between raceways.

10. The device according to claim 9, wherein the upper race is positioned towards the interior of the device and the lower race is positioned toward the exterior of the device.

11. The device of claim 9, wherein the lower support cap further comprises an annular axial projection provided with an annular concave surface of matching shape and forming a support of the lower race of the rolling bearing.

12. The device of claim 1, wherein an annular hollow is defined between the at least one sealing lip and the annular claw.

13. A suspension abutment device comprising:
 a lower support cap provided with an annular radial support portion,
 an upper bearing cap having an annular radial bearing portion, and an annular axial external skirt,
 an annular passage being defined between the annular axial external skirt and the annular radial support portion;
 at least one bearing disposed between an upper surface of the annular radial support portion and a lower surface of the annular radial bearing portion;
 at least one annular seal disposed radially at least in part between the exterior skirt of the upper bearing cap and the at least one bearing;
 the at least one annular seal comprises an annular claw secured by mechanical connection to an interior axial surface of the axial external skirt of the upper bearing cap and at least one sealing lip extending obliquely inwards and downwards from the claw, in the direction of the annular radial support portion of a lower bearing cap, in such a manner that a free end of the at least one sealing lip comes into the immediate proximity of a surface of the annular radial support portion; and
 wherein a lower race is located axially between an upper claw and the at least one annular seal.

14. The device of claim 13, in which the annular claw is of parallelepipedal shape and the at least one sealing lip of the at least one annular seal projects from an interior face of the annular claw.

15. The device of claim 13, in which the external skirt of the upper bearing cap extends axially downwards toward the distal edge of the annular radial support portion.

16. The device of claim 15, in which the distal edge of the annular radial support portion extends axially past the bearing.

17. The device of claim 16, wherein a radial annular space is radially aligned with the bearing.

18. The device of claim 13, in which the at least one annular seal is fixed relative to the support cap and positioned in a radial annular space between the bearings.

19. The device of claim 13, wherein a section of the annular radial support portion extends axially between the at least one sealing lip and the lower race such that section is sandwiched therebetween and adjacent to both the at least one sealing lip and the lower race.

20. The device of claim 19, wherein an annular hollow is defined between the at least one sealing lip and the annular claw.

* * * * *